(12) United States Patent
Cordova

(10) Patent No.: US 8,603,236 B2
(45) Date of Patent: Dec. 10, 2013

(54) PLAY COMPOSITION INCLUDING CROSSLINKABLE BINDER

(75) Inventor: Abimael Cordova, La Mirada, CA (US)

(73) Assignee: Mattel, Inc., El Segundo, CA (US)

( * ) Notice: Subject to any disclaimer, the term of this patent is extended or adjusted under 35 U.S.C. 154(b) by 211 days.

(21) Appl. No.: 12/957,721

(22) Filed: Dec. 1, 2010

(65) Prior Publication Data

US 2012/0142849 A1    Jun. 7, 2012

(51) Int. Cl.
*C08L 5/00* (2006.01)

(52) U.S. Cl.
USPC .............. 106/205.3; 106/205.2; 252/182.14; 524/55

(58) Field of Classification Search
USPC ......... 524/405, 417, 424, 557, 55; 106/205.2, 106/205.3; 252/182.14
See application file for complete search history.

(56) References Cited

U.S. PATENT DOCUMENTS

| | | | |
|---|---|---|---|
| 3,167,440 A | 1/1965 | McVicker et al. | |
| 3,384,498 A | 5/1968 | Ahrabi | |
| 3,632,786 A | 1/1972 | Nickerson | |
| 3,634,280 A | 1/1972 | Dean | |
| 4,076,547 A * | 2/1978 | Lester et al. | 106/779 |
| 4,361,508 A | 11/1982 | Bourland | |
| 4,690,829 A | 9/1987 | Usui | |
| 5,157,063 A | 10/1992 | Wetherell | |
| 5,171,766 A | 12/1992 | Mariano | |
| 5,258,068 A | 11/1993 | Shapero | |
| 5,364,892 A | 11/1994 | Miller | |
| 5,395,873 A | 3/1995 | Mizoule | |
| 5,498,645 A | 3/1996 | Mariano | |
| 5,506,280 A | 4/1996 | Miller | |
| 5,559,186 A | 9/1996 | Fujii et al. | |
| 5,578,119 A | 11/1996 | Short et al. | |
| 5,873,933 A | 2/1999 | Mackey | |
| 5,886,083 A | 3/1999 | Mackey | |
| 5,900,049 A | 5/1999 | Scansani | |
| 5,916,949 A | 6/1999 | Shapero et al. | |
| 5,972,092 A | 10/1999 | Cordova | |
| 6,080,231 A | 6/2000 | Merten et al. | |
| 6,348,534 B1 | 2/2002 | Bianco | |
| 6,359,057 B1 | 3/2002 | Li | |
| 6,387,169 B1 | 5/2002 | Cordova | |
| 6,432,188 B1 | 8/2002 | Takai | |
| 6,444,728 B1 | 9/2002 | Yuyama | |
| 6,509,391 B2 | 1/2003 | Gothjaelpsen et al. | |
| 6,713,624 B1 | 3/2004 | Doane, Jr. et al. | |
| 6,767,938 B1 | 7/2004 | Cordova | |
| 6,881,781 B1 | 4/2005 | Gamba | |
| 6,933,344 B2 | 8/2005 | Shah et al. | |
| 7,101,247 B2 | 9/2006 | Pearce | |
| 2003/0227959 A1 | 12/2003 | Balian et al. | |
| 2004/0048018 A1 | 3/2004 | Pearce | |
| 2004/0151933 A1 | 8/2004 | Ajbani et al. | |
| 2007/0087060 A1 | 4/2007 | Dietrich | |
| 2007/0100052 A1 | 5/2007 | Lee et al. | |
| 2007/0238815 A1 | 10/2007 | Lee et al. | |
| 2008/0050176 A1 | 2/2008 | Amarena | |
| 2008/0287575 A1 | 11/2008 | Lee et al. | |
| 2009/0192250 A1 | 7/2009 | Ijichi et al. | |
| 2010/0064940 A1 | 3/2010 | Wijerama | |
| 2010/0144942 A1 | 6/2010 | Kao | |
| 2010/0190887 A1 | 7/2010 | Wai | |
| 2012/0142827 A1 | 6/2012 | Cordova | |

FOREIGN PATENT DOCUMENTS

| | | |
|---|---|---|
| DE | 2935019 | 3/1981 |
| DE | 19519212 A1 | 11/1996 |
| DE | 19745700 A1 | 4/1999 |
| EP | 2196500 A1 | 6/2010 |
| GB | 2072682 A | 10/1981 |
| JP | 50032238 A | 3/1975 |
| JP | 55052086 | 4/1980 |
| JP | 05194603 | 8/1993 |
| WO | 99/09095 A1 | 2/1999 |

OTHER PUBLICATIONS

Search Report and Written Opinion from corresponding PCT Application No. PCT/US2011/062522, mailed Jul. 16, 2012, 9 pages.

* cited by examiner

*Primary Examiner* — David W Wu
*Assistant Examiner* — Marie Reddick
(74) *Attorney, Agent, or Firm* — Edell, Shapiro & Finnan LLC

(57) ABSTRACT

The present invention is directed toward water based play compositions including a crosslinkable network polymer and a crosslinking system effective to crosslink the polymer. The crosslinking system is a water-soluble salt complex including a primary crosslinking agent, a secondary crosslinking agent, and a tertiary crosslinking agent. The crosslinking system contains a diminished amount of boron compounds while remaining effective in crosslinking network polymers including polyvinyl alcohol (to form moldable dough compositions) and guar gum (to form hydrogels).

15 Claims, No Drawings

PLAY COMPOSITION INCLUDING CROSSLINKABLE BINDER

FIELD OF THE INVENTION

The present invention is directed toward play compositions formed of a binder and a cross-linking system including a water soluble salt complex.

BACKGROUND OF THE INVENTION

Through the years, play compositions of different types have been provided by practitioners in the toy arts to amuse children and adults and to aid in the development of manual skills and dexterity, as well as creativity. While the variety of such play material compositions is numerous, all generally involve the use of free-forming or malleable materials that are manipulated and shaped by the user. Certain materials have been provided which are moldable and tend to retain their shapes (e.g., modeling clay), while others are looser and more free-flowing. Others still are gels having fluid-like flow characteristics.

Regardless of the type of play compositions used, it is essential that such materials be safe for young children. Safety requirements generally mandate that play material compositions be nonirritating to the skin and eyes, and be nontoxic if ingested. Additional requirements have been expected of these materials to avoid damage to clothing, upholstery fabric, or carpeting. Conventional play compositions such as those described above typically include boron compounds such as sodium tetraborate that function as a crosslinking agent. Boron compounds, while an effective crosslinking agent, have recently come under scrutiny by some as a potential irritant when present in high concentrations. Lowering the amount of boron compounds in a composition, however, deteriorates the polymer network the compounds are intended to create. Thus, it is desirable to formulate a crosslinking system that minimizes the amount of boron compounds (and, in particular, sodium tetraborate) while providing the crosslinking properties necessary to form usable play compositions.

SUMMARY OF THE INVENTION

The present invention is directed toward water-based play compositions including a crosslinkable network polymer and a crosslinking system effective to crosslink the polymer. The crosslinking system is a water-soluble salt complex including a primary crosslinking agent, a secondary crosslinking agent, and a tertiary crosslinking agent. The primary crosslinking agent is a water-soluble alkali metal salt or a phosphoric acid sodium salt. The secondary crosslinking agent is a water-soluble alkali metal salt. The tertiary crosslinking agent is a water soluble-boric acid salt. The crosslinking system contains a diminished amount of boron compounds while remaining effective in crosslinking network polymers including polyvinyl alcohol (to form moldable dough compositions) and guar gum (to form hydrogels).

DESCRIPTION OF THE PREFERRED EMBODIMENTS

The crosslinking system of the present invention generates crosslinks between molecules of a crosslinkable polymer to form a polymer network. The crosslinking system is a water-soluble salt complex including a primary crosslinking agent, a secondary crosslinking agent, and a tertiary crosslinking agent (also called a gelling agent or chelating agent). The primary crosslinking agent generates the largest crosslink density in the network polymer (i.e., the binder of the play composition) compared to the other agents within the crosslinking system. That is, the primary crosslinking agent generates the largest number of crosslinks per unit volume in the network polymer. In an embodiment of the present invention, the primary crosslinking agent generates at least about 45% of the crosslinks within the network polymer. By way of example, the primary crosslinking agent generates about 55% of the crosslinks within the network polymer. The primary crosslinking agent is effective in alkaline environments (e.g., environments having pH ranges of 8.5-10). In an embodiment of the present invention, the primary crosslinking agent is a water-soluble alkali metal bicarbonate. By way of example, the primary crosslinking agent is potassium bicarbonate ($KHCO_3$). Alternative compounds may include magnesium bicarbonate, sodium bicarbonate, derivatives thereof and combinations thereof. In another embodiment of the present invention, the primary crosslinking agent is a salt of a phosphoric acid such as disodium hydrogen phosphate ($Na_2HPO_4$, also known as sodium phosphate dibasic), magnesium phosphate dibasic, potassium phosphate dibasic, derivatives thereof, and combinations thereof.

Each of the secondary and tertiary crosslinking agents in the crosslinking system of the present invention generates a lower crosslinking density than that of the primary crosslinking agent (i.e., each generates a lower number of crosslinks per unit volume in the polymer network). In an embodiment, the secondary crosslinking agent generates no more than about 30% of the crosslinks within the network polymer. By way of example, the secondary crosslinking agent generates about 25% of the crosslinks in the network polymer. In an embodiment, the secondary crosslinking agent is a water-soluble alkali metal carbonate. By way of example, the secondary crosslinking agent is a sodium carbonate ($Na_2CO_3$), sodium sulfate, potassium sulfate, potassium carbonate, magnesium carbonate, derivatives thereof and combinations thereof. The secondary crosslinking agent is selected to be effective within a slightly acidic to slightly alkaline environment (e.g., environments having pH ranges of 5.1-8.4)

The tertiary crosslinking agent may generate a lower crosslink density than both the primary and secondary crosslinking agents. The tertiary crosslinking agent may generate no more than 25% of the crosslinks within the network polymer. By way of example the tertiary crosslinking agent generates about 15%-20% of the crosslinks within the network polymer. In an embodiment of the present invention, the tertiary crosslinking agent is a boron compound such as salts of boric acid. By way of example, the tertiary crosslinking agent is sodium tetraborate ($Na_2B_4O_7$). The tertiary crosslinking agent is selected to be effective in acidic to alkaline environments (e.g. environments having a pH of 5.1-9.5).

In an embodiment of the present invention, the primary crosslinking agent is present in the largest amount within the crosslinking system. The secondary crosslinking agent, in turn, is present in an amount less than the primary crosslinking agent, but greater than the amount of the tertiary crosslinking agent.

The agents of the crosslinking system are present in amounts effective to generate the desired level of crosslinking of the binder forming the play composition. For example, when the primary crosslinking agent is sodium phosphate dibasic, the primary crosslinking agent is added to the play composition in an amount of about 0.10 wt % to about 1.5 wt %; the secondary crosslinking agent is added to the play composition in an amount of from about 0.01 wt % to about 0.50 wt %; and the tertiary crosslinking agent is added to the play composition in an amount of from about 0.005 wt % to about 0.50 wt % (based on the total weight of the play composition). By way of further example, when the primary crosslinking agent is potassium bicarbonate, the primary crosslinking agent is added to the play composition in an amount of about 0.50 wt % to about 3 wt %, the secondary crosslinking agent is added to the play composition in an amount of from about 0.10 wt % to about 0.80 wt %; and the tertiary crosslinking agent is added to the play composition in an amount of from about 0.005 wt % to about 0.50 wt % (based on the total weight of the play composition).

The above formulation provides a crosslinking system including a salt complex effective to crosslink the binder throughout various pH levels. The system, while including a substantially lower amount of boron compounds than conventional compositions, is highly effective at creating the desired polymer network. By way of example, the amount of borate compound utilized to crosslink the play composition is less than about 0.50% by weight play composition. Preferably, the amount of borate compound utilized is less than about 0.10% by weight play composition.

As noted above, the crosslinking system in accordance with the present invention is utilized to form play compositions having desired properties. In an embodiment, the crosslinking system is utilized to form gel compositions having cold flow characteristics. For example, the crosslinking system may be utilized in the formation of a flowable gel composition including a polymer or colloidal network that is expanded throughout its whole volume by a fluid. Specifically, the play composition is a hydrogel having distinct flow properties—the gel is amorphous, possesses a high flow rate, and can be recombined after tearing (i.e., the gel is self-healing).

The gel composition includes water and a polymer binder (i.e., a network polymer) crosslinked with the above-described crosslinking system. While tap water may be utilized, deionized water is preferred to minimize the occurrence of any impurities that may interfere with crosslinking. In an embodiment of the present invention, water is present within the gel composition in an amount of about 75 wt % or more and, in particular, about 90 wt % or more. By way of example, the water is present in an amount of about 95% by weight gel composition. Water content below the lower threshold leads to incomplete hydrolysis of the binder (resulting in partial cross-linking), while water in excess of 95% results in excess water, which weakens the polymer network.

In an embodiment, the polymer binder is a network forming guar polymer such as guar gum ($C_{21}H_{36}O_{15}$) and guar derivatives. Guar derivatives include hydroxypropyl guar (HPG), carboxymethyl guar (CMG), carboxymethyl hydroxypropyl guar (CMHPG), and carboxymethyl cellulose. The guar polymers may be nonionic, anionic, or cationic. In an embodiment of the present invention, the polymer binder is present within the gel composition in an amount of about 0.50 wt % to about 3 wt %. By way of example, the amount of polymer binder present is about 1% by weight gel composition.

The crosslinking system includes a combination of agents present in an amount effective to achieve the gel point of the polymer network. In an embodiment of the present invention, the crosslinking system is present within the gel composition in an amount of about 0.10 wt % to about 2.5 wt % and, in particular, about 0.05 wt % to about 2 wt %. By way of example, the amount of crosslinking system present is about 0.65% by weight within the gel composition. In an embodiment of the present invention, the primary crosslinking agent is disodium hydrogen phosphate, the secondary crosslinking agent is sodium carbonate, and the tertiary crosslinking agent is sodium tetraborate. In an embodiment of the present invention, the primary crosslinking agent is present within the gel composition in an amount of about 0.10 wt % to about 1.50 wt %, the secondary crosslinking agent is present in an amount of about 0.01 wt % to about 0.50 wt %, and the tertiary crosslinking agent is present in an amount of about 0.005 wt % to about 0.5 wt %. By way of example, the amount of primary crosslinking is about 0.40% by weight gel composition, the amount of secondary crosslinking agent is about 0.15% by weight gel composition, and the amount of tertiary crosslinking agent is about 0.05% by weight gel composition. In an embodiment of the present invention, the amount of borate compound present in the gel composition is less than about 0.50 wt %, and preferably less than about 0.10 wt %.

The gel composition may include one or more additives. By way of example, the gel composition includes a preservative in an amount of from about 0.50 wt % to about 1.50 wt %. The preservative may include, but is not limited to, phenoxyethanol, methylparaben, ethylparaben, butlyparaben, propylparaben, isobutylparaben and combinations of two or more of the above. By way of specific example, the composition may include about 1 wt % Phenonip® XB (a preservative blend available from Clariant International AG, Muttenz, Switzerland). Many other commercially available preservatives well known to those skilled in the art may also be utilized.

The gel composition of the present invention may also include one or more humectants. Humectants are hygroscopic substances that capture water via absorption or adsorption. Thus, humectants not only aid in the prevention of water loss from the composition, but will capture additional water from the environment. In an embodiment of the present invention, the humectant is present within the gel composition in an amount of about 1 wt % to about 3 wt %. By way of example, the amount of humectant is about 2% by weight gel composition. In an embodiment of the present invention, the humectant is glycerin, diols such as polyethylene glycol, propylene glycol, ethylene glycol, derivatives thereof and mixtures thereof. Humectants such as glycerin and polyethylene glycol also function as plasticizers (promoting elongation/stretch of the composition) and/or dispersants (improve the separation of particles and to prevent settling or clumping).

The gel composition of the present invention may further include a colorant (e.g., a pigment or dye) to enhance its entertainment or play effect. Typical colorants include FD&C Powder Series colorants (available from Sensient Technologies Corporation, Milwaukee, Wis.), as well as the DayGlo® T-Series colorants (available from DayGlo Color Corporation, Cleveland, Ohio). The colorant may be present within the gel composition in an amount of about 0.50 wt % to about 2.50 wt %. By way of example, the amount of colorant present is about 1% by weight gel composition.

The above described gel composition possesses several unique properties, including a specific gravity of approximately 0.8-1.4, a density of approximately 0.8-1.4 $g/cm^3$; and a viscosity of less than about 1000 cP (e.g., about 500 cP to about 1000 cP). The gel composition, moreover, possesses a pH value of 7 or above. By way of example, the gel composition may possess a pH value of about 8.3.

In an embodiment of the present invention, the process to form the gel composition includes the formation and subsequent combining of separate binder and crosslinking system formulations. In a first mixing vessel (e.g., a mixing vessel fitted with a sweep and a homogenizer) a binder formulation or phase is created. A predetermined amount of water at room temperature (e.g., deionized water constituting about 90 wt % of the final composition) is added to the first vessel, along with additives (e.g., preservatives or humectants), and stirring occurs for a predetermined period of time (e.g., about 5-15 minutes). Colorant may be added, followed by the addition of the binder. The resulting solution is mixed for a predetermined period of time to incorporate the binder (e.g., about 3-10 minutes). The solution is then heated to a predetermined temperature range (e.g., 90° F. to 130° F.), and the heated solution is mixed for a predetermined amount of time (e.g., 3-10 minutes).

In a second mixing vessel, the crosslinking system formulation or phase is formed. The primary crosslinking agent, the secondary crosslinking agent, and the tertiary crosslinking agent are added to the second mixing vessel. The remaining water is added and the resulting solution is heated to a predetermined temperature range (e.g., 130° F. to 190° F.). Alternatively, the water may be heated to the predetermined temperature range before its addition to the second mixing vessel. The solution is then maintained at the predetermined temperature to permit dissolution of the crosslinking system components into the water. Once the components of the crosslinking system have dissolved, the crosslinking formulation is added to the first mixing vessel containing the binder formulation. The combined formulations are mixed, forming the gel composition.

A formulation for a gel composition in accordance with an embodiment of the present invention is provided in the example below with reference made to Table I.

EXAMPLE

TABLE I

| Ingredient | Approximate Weight % |
|---|---|
| Deionized Water | 94 |
| Binder | 1 |
| Crosslinking System | |
| Sodium Phosphate (dibasic) | 0.40 |
| Sodium Carbonate (anhydrous) | 0.15 |
| Sodium Tetraborate (anhydrous) | 0.05 |
| Additives (humectant, preservative, colorant) | 4 |

About 90 wt % water, humectant (glycerin 99.5%), and preservative (Phenonip® XB, available from Clariant International Ltd) were added to a mixing vessel and mixed for about 10 minutes. The colorant (FD&C Powder Series, Sensient Technologies®, Milwaukee, Wis.) was added, along with the binder (carboxymethyl hydroxypropyl guar (CM-HPG), available from Economy Polymers & Chemicals, Houston, Tex.). The resulting solution was mixed for about five minutes, and then heated to a temperature of about 115° F. Once heated, the temperature was maintained and the mixing continued for an additional about five minutes. In a second mixing vessel, the sodium phosphate (Spectrum® Chemicals & Laboratory Products), sodium carbonate (Spectrum® Chemicals & Laboratory Products), sodium tetraborate (Spectrum® Chemicals & Laboratory Products), and the remaining water was combined, with the resulting mixture being heated to a temperature of about 170° F. to form a crosslinking solution. The crosslinking solution as added to the solution containing CMHPG, and the resulting mixture was stirred until a viscous gel composition was formed.

The resulting gel composition possessed a measured specific gravity (measured with a GARDCO device) of approximately 1.1 (at 24° C.); a measured density (at 24° C.) of approximately 1.1 g/cm$^3$; a measured pH (at 24° C.) of approximately 8.34; and a measured viscosity (measure at 49° C. with a Brookfield Model FV-II Viscometer) of approximately 720 cP.

The above described formulation provides a playable, cohesive, nontoxic gel composition which has a stretchable, slimy consistency and tactile feel characteristic. The gel has a healable property so that if pulled apart, upon manipulation it will re-adhere to itself. It is believed that the crosslinking system of the present invention generates bonds that, while strong, are dynamic, such that they are constantly forming and dissociating, with the crosslinks moving randomly among the binder molecules. The result is that over short intervals, the strength of the crosslinks gives the gel composition its resilience, but over longer periods, the dynamic nature of the crosslinks allows the binder molecules to move relative to each other to provide the composition with its consistency.

One property of the gel composition of the present invention is a rheology which allows the composition to be formed into molded shapes, as well as to be integrally free flowing between fingers or down inclines. Another property of the gel is its cohesive nature which allows it to be stretched into long strands or stretched into thin membranes without breaking. A still further property of the instant play gel is its unexpected ability to conduct electricity, indicating an ionic mobility characteristic of the gel. The resulting integral mass behaves much like a free flowing amorphous "blob" which easily tears, packs, and recombines and will blanket or coat any surface to which is applied. The play gel material is malleable, pliable, free flowing; has a satisfactory tactile feel; can be used for long periods of time without drying to the point that it becomes unusable; would not be harmful if accidentally ingested; and exhibits a bright, shiny colorful appearance with no unpleasant odor. The play material can be simply cleaned-up and removed from carpets and fabrics with water.

The crosslinking system of the present invention may further be utilized in forming a moldable play composition or dough having soil-like characteristics. In an embodiment of the present invention, the dough composition includes particulate filler, a polymer binder, a thickener, a solvent, and the crosslinking system. The particulate filler may possess any suitable size and shape. In an embodiment of the present invention, the particulate filler possesses a particle size of less than about 100 μm and, in particular, of about 8 μm to 60 μm. The particulate filler includes, but is not limited to, silica, granular material such as sand, and polymer microspheres such as Expancel® DE microspheres (available from AzkoNobel®, Sweden). In an embodiment, the particulate filler constitutes the largest component of the dough composition (measured by weight percent). In one embodiment of the present invention (e.g., when sand is utilized as the filler), the particulate filler may be present within the dough composition in an amount of about 30 wt % to about 50 wt % (e.g., about 40% by weight dough composition). In another embodiment (e.g., when polymer microspheres are utilized as the filler), the particulate filler may be present within the dough composition in an amount of about 3 wt % to about 45 wt %.

The binder includes crosslinkable polymers including vinyl acetate resins such as polyvinyl alcohol, polyacrylic acid, and combinations thereof. In an embodiment of the present invention, the polymeric binder may be fully or partially hydrolyzed polyvinyl alcohol. By way of example, the polyvinyl alcohol is a partially hydrolyzed polyvinyl alcohol having a degree of hydrolysis of 80 to 95 mol % (e.g., CEL-VOL 205 (88% hydrolyzed), available from Sekisu Specialty Chemicals, Dallas, Tex.). The polymeric binder may be present within the dough composition in an amount of about 4 wt % to about 15 wt % and, in particular, in an amount of about 5.50 wt % to about 11.50 wt %. By way of example, the amount of polymeric binder is about 8.50% by weight dough composition. In an embodiment of the present invention, the binder material is polyvinyl pyrrolidine, polyvinyl acetate, and mixtures thereof.

The thickener increases the viscosity of the dough composition, providing body, increasing stability, and improving suspension of ingredients. In an embodiment of the present invention, the thickener includes water-soluble polymers such as polysaccharides. By way of example, the thickener includes methyl cellulose, hydroxymethylcellulose, hydroxyethylcellulose, guar gum, and modified versions of the aforementioned such as guar gum derivatives (e.g., carboxymethyl hydroxypropyl guar). The thickener may be present within the dough composition in an amount of about 0.30 wt % to about 1.50 wt %. By way of example, the amount of thickener is about 0.70% by weight dough composition.

The crosslinking system of the present invention includes a combination of agents present in an amount effective to achieve formation of the polymer network. In an embodiment of the present invention, the crosslinking system is present in the dough composition in an amount of about 0.45 wt % to about 4.0 wt %. By way of example, the amount of crosslinking system is about 1.0% by weight dough composition. In an embodiment of the present invention, the primary crosslinking agent is present in an amount of about 0.50 wt % to about 3 wt %, the secondary crosslinking agent present in an amount of about 0.10 wt % to about 0.80 wt %, and the tertiary crosslinking agent is present in an amount of about 0.005 wt % to about 0.5 0 wt %. By way of specific example, the primary crosslinking agent is present in an amount of about 1% by weight dough composition, the secondary crosslinking agent present in an amount of about 0.15% by weight dough composition, and the tertiary crosslinking agent is present in an amount of about 0.09% by weight dough composition.

In an embodiment of the present invention, the primary crosslinking agent is potassium bicarbonate, the secondary crosslinking agent is sodium carbonate, and the tertiary crosslinking agent is sodium tetraborate. The amount of borate compound utilized in the dough composition is preferably less than about 0.50% by weight, and more preferably less than about 0.10% by weight.

In an embodiment of the present invention, the dough composition further includes a plasticizer to increase the plasticity of the composition. By way of example, the plasticizer includes diols such as ethylene glycol, propylene glycol, polyethylene glycol, polypropylene glycol, and combinations thereof. By way of specific example, the plasticizer is propylene glycol. The plasticizer may be present within the dough composition in an amount of about 2 wt % to about 10 wt % and, in particular, in an amount of about 3 wt % to about 7 wt %. By way of example, the amount of plasticizer is about 5% by weight dough composition.

In an embodiment of the present invention, the dough composition further includes a humectant to inhibit drying of the composition (by absorbing/adsorbing water). By way of example, the humectant is a polyol such as glycerin. The glycerin may present within the dough composition in an amount of about 0.50 wt % to about 8 wt % and, in particular, about 1 wt % to about 5 wt %. By way of example, the amount of humectant is about 3% by weight dough composition.

Water is generally used as the solvent. Tap water may be utilized; however, deionized water is preferred to minimize the potential for impurities that could interfere with crosslinking. In an embodiment of the present invention, water is present within the dough composition in an amount of about 25 wt % to about 75 wt %. By way of example, the amount of water present is about 35% by weight dough composition.

In an embodiment of the present invention, the dough composition includes various additives. For example, the composition may include an opacifying agent such as an acrylate emulsion (e.g., a styrene/acrylic emulsion (Acusol® OP301, available from Dow®)). The opacifying agent may be present within the dough composition in an amount of about 1 wt % to about 4 wt % (e.g., about 2 wt %). In addition, the dough composition of the present invention may include an antifoaming agent such as a silicone emulsion (e.g., Antifoam FG-10, available from Dow Corning®) present in an amount of about 0.10 wt % to about 1 wt % (e.g., 0.30 wt %).

Releasing agents can also be added to the dough composition of the present invention to reduce tackiness. Typical releasing agents include mineral oil, petroleum, and silicon wax (e.g., Xiameter® 200 polydimethylsiloxane, available from Dow Corning®) present in the composition in an amount of about 0.50 wt % to about 3 wt % (e.g., about 2 wt %). A preservative can be added to the dough composition of the present invention to increase shelf life, and a wide variety of preservatives are available. By way of example, preservatives include, but are not limited to, phenoxyethanol, methylparaben, ethylparaben, butlyparaben, propylparaben, isobutylparaben and combinations of two or more of the above. By way of specific example, the composition may include about 1 wt % Phenonip® XB (a preservative blend available from Clariant International AG, Muttenz, Switzerland). Many other commercially available preservatives well known to those skilled in the art may be used. In an embodiment of the present invention, the preservative is present within the dough composition in an amount of about 0.50 wt % to about 1.50 wt %.

The dough composition of the present invention may further include a colorant (e.g., a pigment or dye) to enhance its entertainment or play effect. Typical colorants include FD&C Powder Series or Iron Oxide Series colorants (available from Sensient Technologies Corporation, Milwaukee, Wis.), as well as the DayGlo® T-Series colorants (available from Day-Glo Color Corporation, Cleveland, Ohio). The colorant may be present in an amount of about 0.50 wt % to about 2.50 wt %. By way of example, the amount of colorant is about 1% by weight dough composition. The dough composition of the present invention may further include a softening oil such as petroleum oil (e.g., a white mineral oil such as Drakeol® 9, available from Calumet Specialty Products Partners) present in an amount of about 1 wt % to about 3 wt % (e.g., about 2 wt %).

A formulation for a moldable dough composition in accordance with an embodiment of the present invention is provided in the example below with reference made to Table II.

Example

TABLE II

| Ingredient | Approximate Weight % |
| --- | --- |
| Deionized Water | 34 |
| Particulate Filler | 40 |
| Binder | 8 |

TABLE II-continued

| Ingredient | Approximate Weight % |
| --- | --- |
| Plasticizer | 5 |
| Humectant | 3 |
| Opacifying Agent | 2 |
| Mineral Oil | 2 |
| Crosslinking System | |
| Potassium Bicarbonate | 1 |
| Sodium Carbonate (anhydrous) | 0.15 |
| Sodium Tetraborate (anhydrous) | 0.10 |
| Misc (preservatives, colorant, antifoaming agent, release agent, thickener) | 5 |

Initially, a binder formulation is created. About 25 wt % deionized water at room temperature was added to a first vessel in the form of a jacketed mixing tank fitted with a mixer, a sweep, a turbine, and a homogenizer. The binder (Celvol® 205 Polyvinyl Alcohol, 88% hydrolyzed, available from Sekisui Specialty Chemicals, LLC, Dallas, Tex.) is added and mixed for about 10 minutes. The resulting solution is heated to a temperature of about 88° C.-93° C. The homogenizer is deactivated, and mixing continues for about 2-3 hours at the elevated temperature.

The now homogenous solution is cooled to room temperature. The plasticizer (propylene glycol, Spectrum® Chemicals & Laboratory Products), the humectant (glycerin 99.5%, Spectrum® Chemicals & Laboratory Products), and the thickener (hydroxyethylcellulose, Natrosol® 250 HH CS, Ashland Chemical Aqualon Division, Wilmington, Del.) are added, and mixing is continued for about 15 minutes. The colorant (Iron Oxide Series pigment, Sensient Technologies®, Milwaukee, Wis.) is added, and mixing is continued about 5 minutes. The preservative (Phenonip® XB, available from Clariant International Ltd) is then added and mixing continued for about 20 minutes.

In a second mixing vessel, a crosslinking system formulation is created. Specifically, the potassium bicarbonate (Spectrum® Chemicals & Laboratory Products), sodium carbonate (Spectrum® Chemicals & Laboratory Products), sodium tetraborate (Spectrum® Chemicals & Laboratory Products), and the remaining water is combined, and then mixed until dissolved.

In a third mixing vessel (e.g., a Hobart mixing bowl), the particulate filler (silica sand, available from Sand Art), the mineral oil (Drakeol® 9, available from Calumet Specialty Products partners, LP), and any other fillers are combined. The binder solution from the first mixing vessel is added and mixed until dispersed (about 15 minutes). Finally, the crosslinking solution from the second mixing vessel is added, and the combined mixtures are mixed until the desired material is formed.

The resulting composition is a modeling dough material that is kneadable, moldable, pliant and ductile enough to avoid tearing during use; that can be used for long periods of time without drying to the point that it becomes unusable; that is not harmful if accidentally ingested; and that exhibits a pleasant tactile feel with no unpleasant odor. The dough composition of the present invention possesses a unique combination of properties, including both a high degree of stretchability and a high degree of pliability when stress is applied. It does not flow appreciably under a rapid blow, but will flow readily under the application of a low, steady pressure. Other properties include excellent stability throughout a very wide temperature range.

While the present inventions have been described in detail and with reference to specific embodiments thereof, it will be apparent to one skilled in the art that various changes and modifications can be made therein without departing from the spirit and scope thereof. Weight percent refers to the amount of a component within the finished composition, unless otherwise noted. While the process for forming the compositions includes preferred steps, as well as preferred time and temperature parameters, it should be understood that the play compositions may be formulation utilizing other process steps, other temperatures, and other mixing times. Thus, it is intended that the present invention covers the modifications and variations of these inventions provided they come within the scope of the appended claims and their equivalents. Terms such as "first," "second," "third," etc., merely identify one of a number of portions, components and/or points of reference as disclosed herein, and do not limit the present inventions to any particular compositions, configurations, or orientations. Although the disclosed inventions are illustrated and described herein as embodied in one or more specific examples, it is nevertheless not intended to be limited to the details shown, since various modifications and structural changes may be made therein without departing from the scope of the inventions. In addition, various features from one of the embodiments may be incorporated into another of the embodiments. Accordingly, it is appropriate that the inventions be construed broadly and in a manner consistent with the scope of the disclosure.

Having described preferred embodiments, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A flowable play gel composition comprising:
   water;
   a binder, wherein the binder is guar gum; and
   a crosslinking system to crosslink the binder, the crosslinking system comprising:
      a primary crosslinking agent comprising a first alkali metal salt,
      a secondary crosslinking agent comprising a second alkali metal salt, wherein the crosslinking density generated in the binder by the secondary crosslinking agent is less than the crosslinking density generated in the binder by the primary crosslinking agent, and
      a tertiary crosslinking agent comprising a borate salt present in an amount of about 0.50 wt % or less based on the weight of the gel composition,
   wherein the crosslinking system and the binder cooperate to form a hydrogel including a polymer network expanded throughout its volume by the water.

2. The flowable play gel of claim 1, wherein the tertiary crosslinking agent is present in an amount of about 0.10 wt % or less based on the weight of the gel composition.

3. The flowable play gel of claim 1, wherein:
   the primary crosslinking agent is a phosphoric acid salt; and
   the secondary crosslinking agent is a carbonic acid salt.

4. The flowable play gel composition of claim 3, wherein:
the primary crosslinking agent is disodium hydrogen phosphate;
the secondary crosslinking agent is sodium carbonate; and
the tertiary crosslinking agent is sodium tetraborate.

5. The flowable play gel composition of claim 1, wherein:
the water is present in a range of about 75 wt % to about 95 wt % based on the weight of the gel composition;
the guar gum binder is present in a range of about 0.50% wt to about 3 wt % based on the weight of the gel composition; and
the crosslinking system is present in a range of about 0.10 wt % to about 2.5 wt % based on the weight of the gel composition.

6. The flowable play gel composition of claim 5, wherein:
the primary crosslinking agent is present within the gel composition in an amount of about 0.10 wt % to about 1.5 wt %;
the secondary crosslinking agent is present within the composition in an amount of from about 0.01 wt % to about 0.50 wt %; and
the tertiary crosslinking agent is present within the composition in an amount of from about 0.005 wt % to about 0.50 wt %.

7. The flowable composition of claim 1, wherein:
the guar gum is carboxylmethyl hydroxypropyl guar;
the cross-linking system comprises:
disodium hydrogen phosphate,
sodium carbonate, and
sodium tetraborate; and
the water is present within the composition in an amount of from about 75 wt % to about 95 wt %, the guar gum is present within the composition in an amount of from about 0.50 wt % to about 3 wt %, and crosslinking system is present within the composition in an amount of from about 0.1 wt % to about 2.5 wt %.

8. The flowable play gel composition of claim 1, wherein the crosslinking system is present within in a range of from about 0.10 wt % to about 2.5 wt % based on the weight of the gel composition.

9. A flowable play gel composition comprising:
water;
a binder; and
a crosslinking system to crosslink the binder, the crosslinking system comprising:
a primary crosslinking agent comprising disodium hydrogen phosphate,
a secondary crosslinking agent comprising sodium carbonate, wherein the crosslinking density generated in the binder by the secondary crosslinking agent is less than the crosslinking density generated in the binder by the primary crosslinking agent, and
a tertiary crosslinking agent comprising sodium tetraborate,
wherein the crosslinking system and the binder cooperate to form a hydrogel including a polymer network expanded throughout its volume by the water.

10. The flowable play gel composition of claim 9, wherein the binder comprises guar gum.

11. The flowable play gel of claim 9, wherein the tertiary crosslinking agent is present in an amount of about 0.50 wt % or less based on the weight of the gel composition.

12. The flowable play gel composition of claim 9, wherein:
the water is present in a range of about 75 wt % to about 95 wt % based on the weight of the gel composition; and
the crosslinking system is present in a range of about 0.10 wt % to about 2.5 wt % based on the weight of the gel composition.

13. The flowable play gel composition of claim 12, wherein:
the primary crosslinking agent is present within the gel composition in an amount of about 0.10 wt % to about 1.5 wt %;
the secondary crosslinking agent is present within the composition in an amount of from about 0.01 wt % to about 0.50 wt %; and
the tertiary crosslinking agent is present within the composition in an amount of from about 0.005 wt % to about 0.50 wt %.

14. A flowable play gel composition comprising:
water;
a binder comprising guar gum; and
a crosslinking system to crosslink the binder, the crosslinking system comprising:
a primary crosslinking agent comprising a first alkali metal salt,
a secondary crosslinking agent comprising a second alkali metal salt, and
a tertiary crosslinking agent comprising sodium tetraborate, the tertiary crosslinking agent being present in an amount of up to about 0.10 wt % based on the weight of the gel composition,
wherein the crosslinking density generated in the binder by the secondary crosslinking agent is less than the crosslinking density generated in the binder by the primary crosslinking agent, and wherein the crosslinking system and the binder cooperate to form a hydrogel including a polymer network expanded throughout its volume by the water.

15. The flowable composition of claim 14, wherein:
the cross-linking system comprises:
disodium hydrogen phosphate,
sodium carbonate, and
sodium tetraborate; and
the water is present within the composition in an amount of from about 75 wt % to about 95 wt %; and
the crosslinking system is present within the composition in an amount of from about 0.1 wt % to about 2.5 wt %.

* * * * *